US011384555B2

(12) United States Patent
Spicer et al.

(10) Patent No.: US 11,384,555 B2
(45) Date of Patent: *Jul. 12, 2022

(54) SYSTEM, METHOD AND APPARATUS FOR OPENING A SPA HARD COVER

(71) Applicant: STRONG INDUSTRIES, INC., Northumberland, PA (US)

(72) Inventors: Wade Spicer, Northumberland, PA (US); Charles M. Woods, West Manchester, OH (US)

(73) Assignee: Strong Industries, Inc., Northumberland, PA (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/695,751

(22) Filed: Nov. 26, 2019

(65) Prior Publication Data

US 2020/0095790 A1 Mar. 26, 2020

Related U.S. Application Data

(63) Continuation of application No. 15/895,087, filed on Feb. 13, 2018, now Pat. No. 10,519,680.
(Continued)

(51) Int. Cl.
| | |
|---|---|
| *E04H 4/08* | (2006.01) |
| *F16H 25/20* | (2006.01) |
| *F16D 7/02* | (2006.01) |
| *F16H 21/44* | (2006.01) |
| *F16B 7/04* | (2006.01) |
| *F16D 7/00* | (2006.01) |

(Continued)

(52) U.S. Cl.
CPC ............... *E04H 4/084* (2013.01); *F16B 7/04* (2013.01); *F16B 7/182* (2013.01); *F16D 7/005* (2013.01); *F16D 7/027* (2013.01); *F16H 21/44* (2013.01); *F16H 25/20* (2013.01); *F16B 7/14* (2013.01); *F16B 33/002* (2013.01); *F16H 19/0622* (2013.01); *F16H 2019/0613* (2013.01)

(58) Field of Classification Search
CPC .. E04H 4/084; F16B 7/182; F16B 7/04; F16B 7/14; F16B 33/002; F16D 7/005; F16D 7/027; F16H 21/44; F16H 25/20; F16H 19/0622; F16H 2019/0613
USPC ........................................................... 4/498
See application file for complete search history.

(56) References Cited

U.S. PATENT DOCUMENTS

| | | |
|---|---|---|
| 5,566,403 A | 10/1996 | Black et al. |
| 6,795,984 B1 | 9/2004 | Brady |

(Continued)

OTHER PUBLICATIONS

European Search Report dated Mar. 9, 2021 from corresponding European Patent Application No. 18751582.0.

(Continued)

*Primary Examiner* — Tuan N Nguyen
(74) *Attorney, Agent, or Firm* — Grogan, Tuccillo & Vanderleeden LLP

(57) ABSTRACT

A cover lift system for a spa includes a lifter handle having an upper arm and a lower arm telescopically connected to the upper arm, the upper arm being configured for operative connection to a cover of a spa, and the lower arm being configured for pivotal connection to a base of the spa, and an adjuster mechanism associated with the lifter handle for selectively adjusting a length of the lifter handle to allow for use of the lifter handle with spas of varying sizes.

19 Claims, 17 Drawing Sheets

Related U.S. Application Data

(60) Provisional application No. 62/458,164, filed on Feb. 13, 2017.

(51) Int. Cl.
  *F16B 7/18* (2006.01)
  *F16H 19/06* (2006.01)
  *F16B 7/14* (2006.01)
  *F16B 33/00* (2006.01)

(56) References Cited

U.S. PATENT DOCUMENTS

| | | |
|---|---|---|
| 10,519,680 B2 * | 12/2019 | Spicer .................... E04H 4/084 |
| 2003/0150054 A1 | 8/2003 | Tudor et al. |
| 2006/0053543 A1 | 3/2006 | Vargas et al. |
| 2006/0075941 A1 | 4/2006 | Seidl et al. |
| 2006/0162060 A1 * | 7/2006 | Coleman ................. E04H 4/084 4/498 |
| 2007/0107118 A1 | 5/2007 | Tudor et al. |
| 2009/0211011 A1 | 8/2009 | Walker et al. |
| 2012/0137423 A1 | 6/2012 | Gardenier et al. |
| 2015/0345163 A1 | 12/2015 | Cunerty |
| 2016/0123028 A1 | 5/2016 | Cunerty et al. |

OTHER PUBLICATIONS

International Search Report dated May 14, 2018 from corresponding PCT Patent Application PCT/US2018/017921.
Office Action from corresponding Canadian Patent Application No. 3,049,986 dated May 7, 2021.

* cited by examiner

SYSTEM, METHOD AND APPARATUS FOR OPENING A SPA HARD COVER

CROSS-REFERENCE TO RELATED APPLICATIONS

This application is a continuation application of, and claims the benefit of, U.S. patent application Ser. No. 15/895,087, filed on Feb. 13, 2018, which claims the benefit of U.S. Provisional Application Ser. No. 62/458,164, filed on Feb. 13, 2017, each of which are hereby incorporated by reference herein in their entireties.

FIELD OF THE INVENTION

The present invention relates generally to spas and, more particularly, to manual and automated mechanisms for opening and closing a spa hard cover.

BACKGROUND OF THE INVENTION

Spas, also commonly known as hot tubs, are popular fixtures that are used in many homes. They generally include a deep, vacuum formed tub having a smooth acrylic liner that is filled with heated water and which is used for soaking and relaxation. Spas typically include water jets for massage purposes.

Typically, the acrylic liner is formed into shapes that provide a variety of seating arrangements within the tub. Each seat is usually equipped with hydrotherapy jets that allow a pressurized flow of water to be directed at various parts of a user's body. The water flow may be aerated for additional effect, and some or all of the jets may also automatically move or rotate, causing the changing pressure of the water on the body to provide a massage like effect.

Because many spas/hot tubs are located outdoors, they are often equipped with covers for enclosing the tub when not in use. These covers help prevent dirt, leaves and other debris from entering the water, and provide a safety function by preventing children and animals from falling into the water. Moreover, spa covers are often insulated so as to limit heat loss from the water when the spa is not in use, for purposes of energy efficiency and readiness of use.

Both soft and hard covers are known in the art. Typical hard covers generally consist of a hollow plastic shell that can be filled with an insulating foam. These covers typically include internal ribs or columns (also referred to as "kiss offs") that extend between the top shell member and the bottom shell member of the cover to provide structural rigidity and support to the cover. These kiss-offs, while providing rigidity, can degrade the overall insulative benefits of the cover by providing a conductive means for heat to escape the spa to atmosphere.

In connection with the above, typical hard covers for spas may be formed using a variety of molding methods, such as through rotational molding and blow molding, as well as vacuum forming. These hard covers typically require some sort of lift mechanism to remove them from the spa. Soft covers can be manually slid off the spa and manually slid back on with significant effort. Hard covers require an assist mechanism to remove them due to the hard nature of the cover material and the increased weight over a soft cover. Existing cover lifter systems can suffer from water infiltration issues, difficulty in installation, much greater difficulty in servicing in the field do to mechanisms being installed from within the spa cabinet interior, and non-reproducibility of the lifter positioning system due to less than optimum fixturing.

In view of the above, there remains a need for a cover lifter system that has improved performance properties, repeatability, structural integrity, ease of installation from the outside of the cabinet frame, improved adjustability, and a related ease of service and adjustment in the field.

SUMMARY OF THE INVENTION

It is an object of the present invention to provide a manual cover lift system for a spa.

It is another object of the present invention to provide an automated cover lift system for a spa.

It is another object of the present invention to provide an automated cover lift system that incorporates a friction or otherwise torque limiting breakaway that will release the drive mechanism from the cover when resistance to opening or closing is encountered by people or objects, for a spa.

It is another object of the present invention to provide an automated cover lift system that incorporates a friction or otherwise torque limiting breakaway that will release the drive mechanism from the cover when a person lifts up on the cover with nominative and sufficient force to break it free in an emergency or out of power situation where the spa cover needs to be opened, for a spa.

It is another object of the present invention to provide an automated cover lift system that incorporates a friction or otherwise torque limiting breakaway that will release the drive mechanism from the cover and will be fully restored to normal operating conditions when the cover is recycled through a normal opening and closing cycle, for a spa.

It is another object of the present invention to provide a cover lift system for a spa that has improved strength, rigidity and repeatability.

It is another object of the present invention to provide a cover lift system for a spa that has an improved resistance to water infiltration.

It is another object of the present invention to provide a cover lift system for a spa that is more easily installed during manufacturing of the spa.

It is another object of the present invention to provide a cover lift system for a spa that is more easily adjusted during manufacturing of the spa.

It is another object of the present invention to provide a cover lift system for a spa that can be easily removed after manufacturing of the spa and shipped in a separate box and not attached to the spa where damage can occur during transportation to the customer.

It is another object of the present invention to provide a cover lift system for a spa that can be easily re-installed and re-adjusted in the field.

These and other objects are achieved by the present invention.

According to an embodiment of the present invention, a cover lift system for a spa includes a lifter handle having an upper arm and a lower arm telescopically connected to the upper arm, the upper arm being configured for operative connection to a cover of a spa, and the lower arm being configured for pivotal connection to a base of the spa, and an adjuster mechanism associated with the lifter handle for selectively adjusting a length of the lifter handle to allow for use of the lifter handle with spas of varying sizes.

According to another embodiment of the invention, a spa includes a base having a support frame, a shell supported by the support frame, a cover member positioned atop the base, and a cover lift system mounted to an exterior-facing surface of the support frame behind a removable side panel of the base.

According to yet another embodiment of the present invention, a method of installing a cover lift system on a spa includes providing a lifter handle having an upper arm and a lower arm telescopically connected to the upper arm, the upper arm being configured for operative connection to a cover of the spa, and the lower arm being configured for pivotal connection to a base of the spa, and adjusting a length of the lifter handle in dependence upon a size of the spa. Adjusting the length includes at least one of extending the lower arm from the upper arm to increase the length of the lifter handle or retracting the lower arm into the upper arm to decrease the length of the handle.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
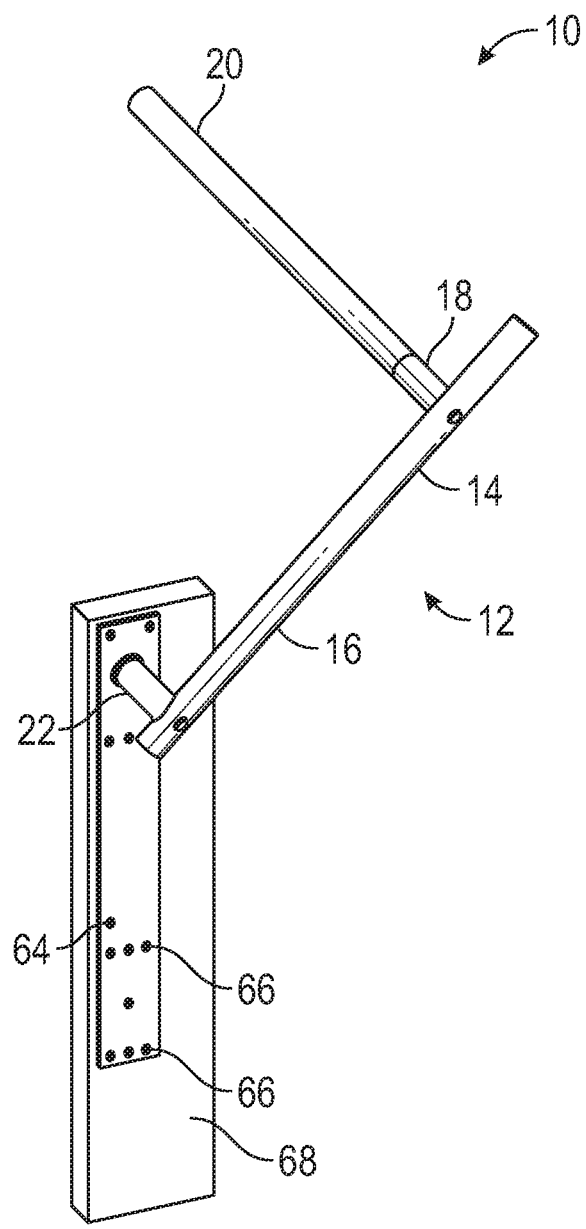
FIG. 1 is a perspective view of a cover lift system according to an embodiment of the invention, viewed from exterior to a spa.

Referring to FIGS. 1-4, a cover lift system 10 according to an embodiment of the present invention is illustrated. The cover lift system 10 includes a lifter handle 12 having a generally tubular first, upper arm 14 and a generally tubular, second lower arm 16 telescopically received by the upper arm 14. The upper arm 14 is generally L-shaped and includes a hollow connector member 18 that extends generally perpendicularly from an upper end of the upper arm 14, which is configured to facilitate the attachment of a crossbar 20 of the cover lift system 10 to the upper arm 14 in the manner discussed hereinafter. Similarly, the lower arm 16 is generally L-shaped and has a hollow connector member 22 that extends generally perpendicularly from a lower end of the lower arm 16, which is configured to facilitate coupling of a lift-assist mechanism of the cover lift system 10 to the lower arm 16, in the manner discussed hereinafter.

Figure 5:
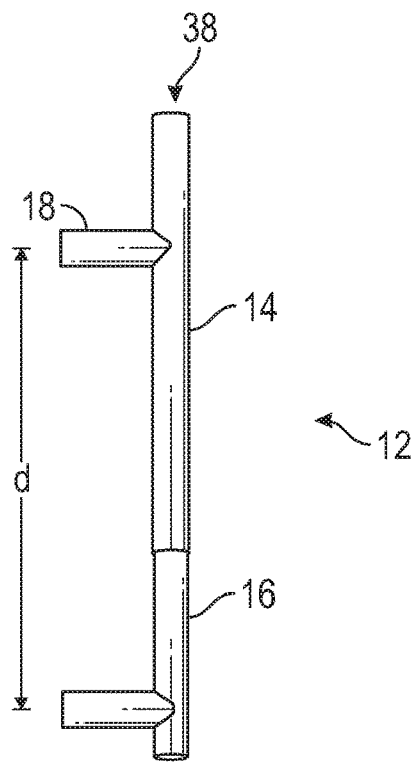
FIG. 5 is a plan view of a lifter handle of the cover lift system of FIG. 1.
Figure 6:
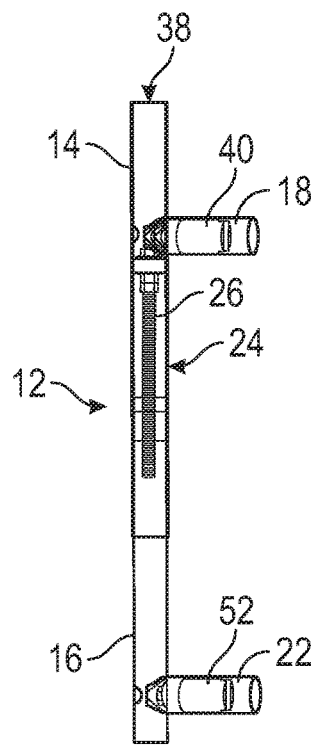
FIG. 6 is a transparent, plan view of the lifter handle of FIG. 5.
Figure 7:
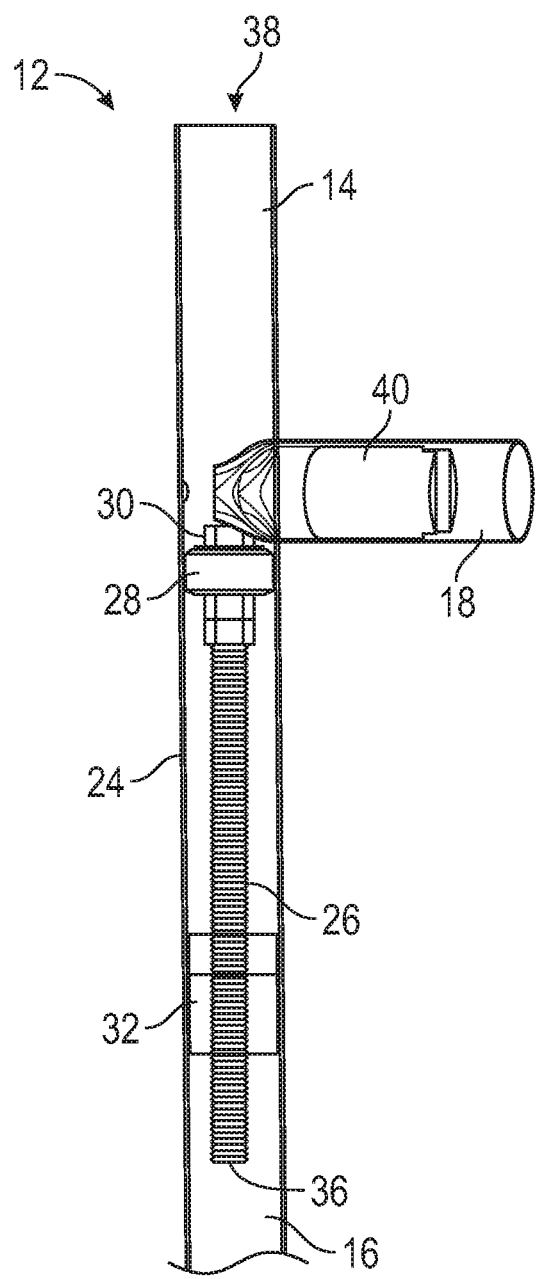
FIG. 7 is an enlarged, transparent plan view of a portion of the lifter handle of FIG. 5, shown an adjuster mechanism thereof.

With specific reference to FIGS. 5-7, the lifter handle 12 includes an adjuster mechanism 24 for selectively adjusting a length of lifter handle 12 and, in particular, a distance, d, between the connector member 18 of the upper arm 14 and the connector member 22 of the lower arm 16. In particular, the adjuster mechanism 24 is selectively actuatable to either draw the connector members 18, 22 towards one another to shorten the distance, d, or to move the connector members 18, 22 away from one another to lengthen the distance, d. In an embodiment, the adjuster mechanism 24 is a linear actuator such as, for example, a leadscrew. In particular, as illustrated in FIG. 7, the adjuster mechanism 24 may include a leadscrew 26 mounted in fixed longitudinal position within the hollow upper arm 14 via fixing member 28. The leadscrew 26 has a drive head 30 configured for mating coupling with a hex socket (not shown) that enables the leadscrew 26 to be rotated within the upper arm 14 and fixing member 28. Within the upper end of the lower arm 16 is fixedly mounted a nut 32 having a threaded bore 34 for threadedly receiving a distal end 36 of the leadscrew 26.

In operation, a socket (not shown) may be inserted into an open, upper end 38 of the upper arm 14 and engaged with the drive head 30 of the leadscrew 26 to rotate the leadscrew 26 while the nut 32 within the lower arm 16 remains stationary. Depending on the direction of rotation of the leadscrew 26, the nut 32 is either drawn up the leadscrew towards the head 28, thereby drawing the lower arm 16 further into the upper arm 14 and decreasing the distance, d, or advanced towards the distal end 36 of the leadscrew 26, thereby extending the lower arm 16 from the upper arm 14 and increasing the distance, d. While the adjuster mechanism 24 is shown and described herein as taking the form of a leadscrew, other types of linear actuators known in the art may also be utilized without departing from the broader aspects of the invention. Importantly, the adjuster mechanism 24 allows for the selective adjustment of the distance, d, between the connector member 18 of the upper arm 14 and the connector member 22 of the lower arm 16, enabling the cover lift system 10 to be utilized with a range of spa sizes.

Figure 8:
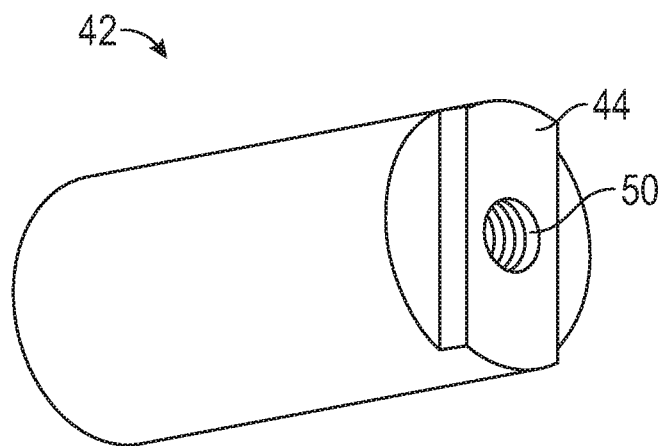
FIG. 8 is perspective view of a coupling member of a crossbar of the cover lift system of FIG. 1.
Figure 9:
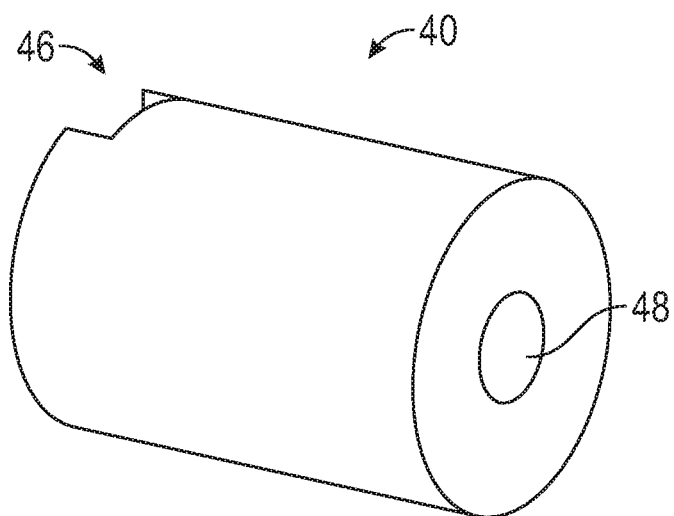
FIG. 9 is a perspective view of a coupling member of an upper arm of the cover lift system of FIG. 1.

Referring now to FIGS. 6-9, the hollow connector member 18 of the upper arm 14 contains a first mechanical coupling member 40 fixedly mounted therein, which is configured to matingly engage a corresponding second mechanical coupling member 42 fixedly mounted within the crossbar 20. FIGS. 6 and 7 illustrate the first coupling member mounted within the hollow connector member 18 of the upper arm 14. As illustrated in FIGS. 8 and 9, the respective coupling members 40, 42 may have a shape and size that corresponds to the shape and size of the interior of the hollow connector member 18 of the upper arm 14 and the crossbar 20, respectively. As best shown in FIGS. 8 and 9, for example, the coupling members 40, 42 may be substantially cylindrical in shape. One of the coupling members, for example, coupling member 42 within the crossbar 20, may include a key 44 configured to be received in a corresponding slot 46 of the coupling member 40 of the upper arm 14 to connect the crossbar 20 to the upper arm 14 of the lifter handle 12. Bores 48, 50 may extend through the coupling members 40, 42, one or both of which may be threaded. The engagement of the key 44 within the slot 46 prevents relative rotation of the crossbar 20 with respect to the hollow connector member 18 so that a rotational covering or uncovering force can be transmitted from the lifter handle 12 to the crossbar 20 (and ultimately to a cover member), as discussed hereinafter.

Figure 10:
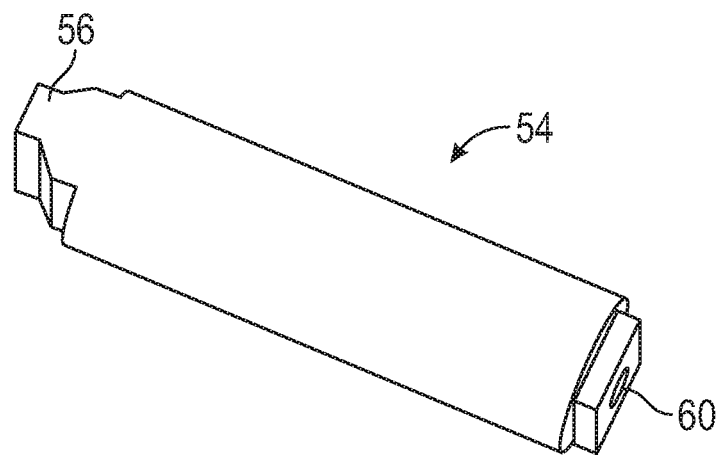
FIG. 10 is a perspective view of a shaft insert of a lift mechanism.
Figure 11:
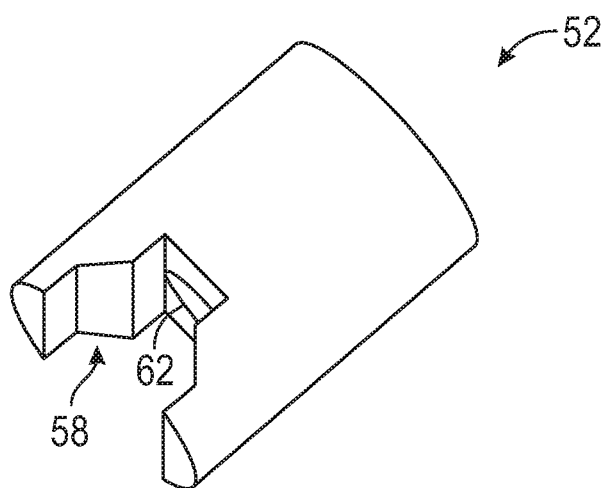
FIG. 11 is a perspective view of a coupling member of a lower arm of the cover lift system of FIG. 1.
Figure 12:
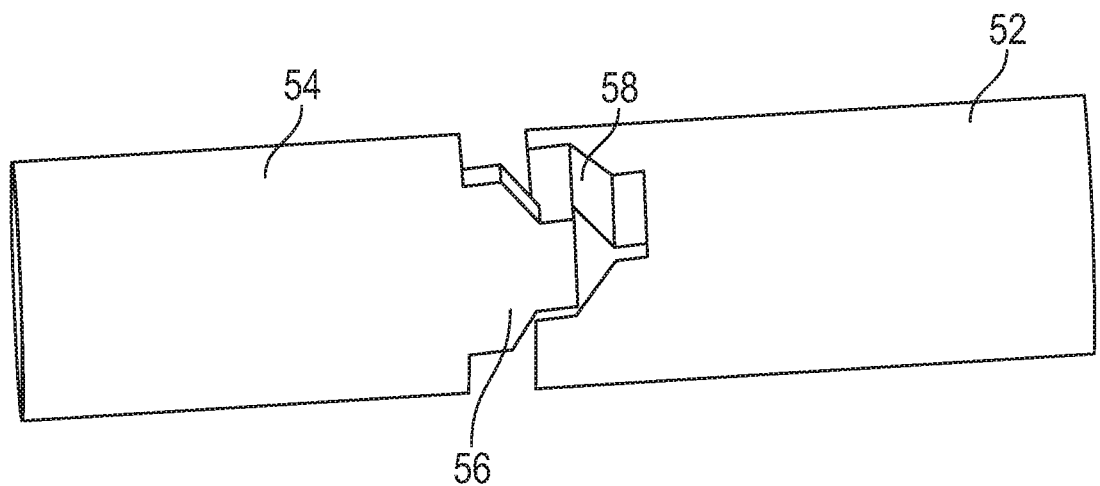
FIG. 12 is a perspective view of an interface between the coupling member of the lower arm and the shaft insert.

Turning now to FIGS. 10-12, the hollow connector member 22 of the lower arm 16 contains a third mechanical coupling member 52 fixedly mounted therein, which is configured to matingly engage a shaft insert 54 of a lifter mechanism (and shaft 55 thereof), as described in detail hereinafter. As illustrated in FIGS. 10 and 11, the coupling member 52 and shaft insert 54 may be substantially cylindrical in shape. Importantly, one of the coupling member 52 and shaft insert 54 (e.g., the shaft insert 54 in FIG. 10) may have a stepped geometry in the form of a key 56 at one end thereof that tapers to a narrow tip. This stepped key 56 is configured to be received in a correspondingly shaped stepped slot 58 formed in an end of the other of the coupling member 52 and the shaft insert 54 (e.g. the coupling member 52 in FIG. 11). Bores 60, 62 may extend through the coupling member 52 and shaft insert 54, one or both of which may be threaded. Importantly, the geometry of the interfaces (namely, the stepped key 56 and corresponding keyway or slot 58) allow the lifter handle 12 to be inserted onto the lifter mechanism shaft 54 with up to about a 20 degree rotational misalignment and still be drawn together with a bolt (through bores 60, 62) that will pull them to proper alignment. FIG. 12 illustrates how a successful mating and interlocking between the coupling member 52 and shaft insert 54 can be achieved even with a substantial misalignment between the two parts.

This feature not only makes it very easy to assemble these parts during manufacturing, but it allows for servicing in the field without the necessity of removing the sides of the spa. Moreover, when the system is fully assembled, the lifter mechanism (not shown) is loaded with an air spring that causes it to rotate about 18 degrees out of alignment with the lifter handle 12 when the cover is lying flat atop the spa. This coupling design allows the non-aligned coupling member 52 and shaft insert 54 to be mated together and pulled into alignment simply by tightening a bolt that extends through both parts.

Figure 2:
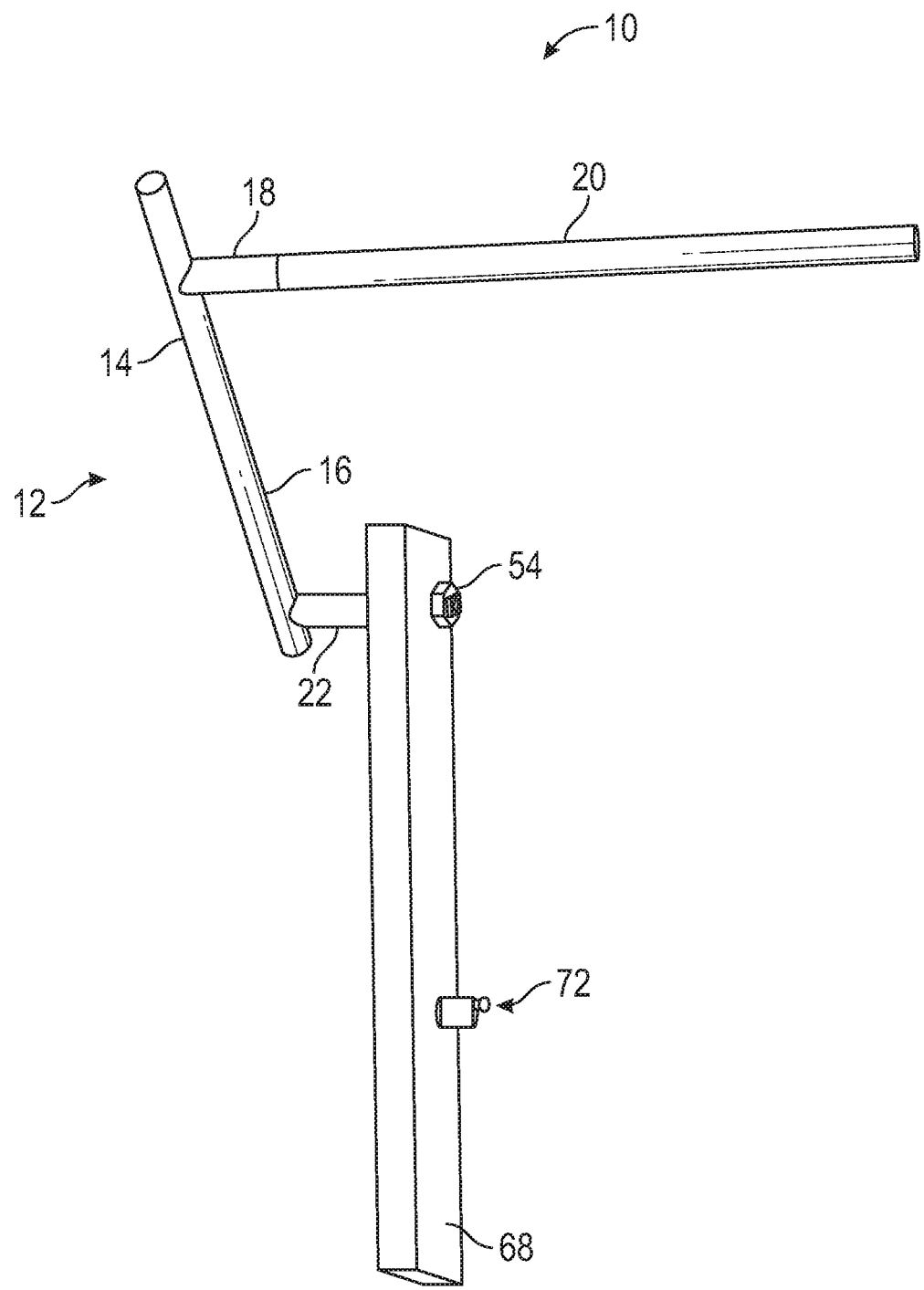
FIG. 2 is another perspective view of the cover lift system of FIG. 1, viewed from interior to the spa.

Referring once again to FIGS. 1-3, the cover lift system 10 also includes a generally planar mounting bracket 64 having a plurality of apertures 66 through which fasteners may be inserted to couple the cover lift system 10 to a frame of a spa. For example, in an embodiment, the mounting bracket 64 may be mounted to an upright 68 or corner strut of a frame of a spa. As best shown in FIG. 2, the shaft insert 54, which is mated with the coupling 52 within the connector member 22 of the lower arm 16, extends through an aperture 70 in the mounting bracket 64 and through the frame upright 68. The end of the shaft insert 54 is configured for operative connection to the upper end of a lift assist mechanism (not shown), such as a gas spring, that provides an assisting force for a covering and/or uncovering operation.

Figure 3:
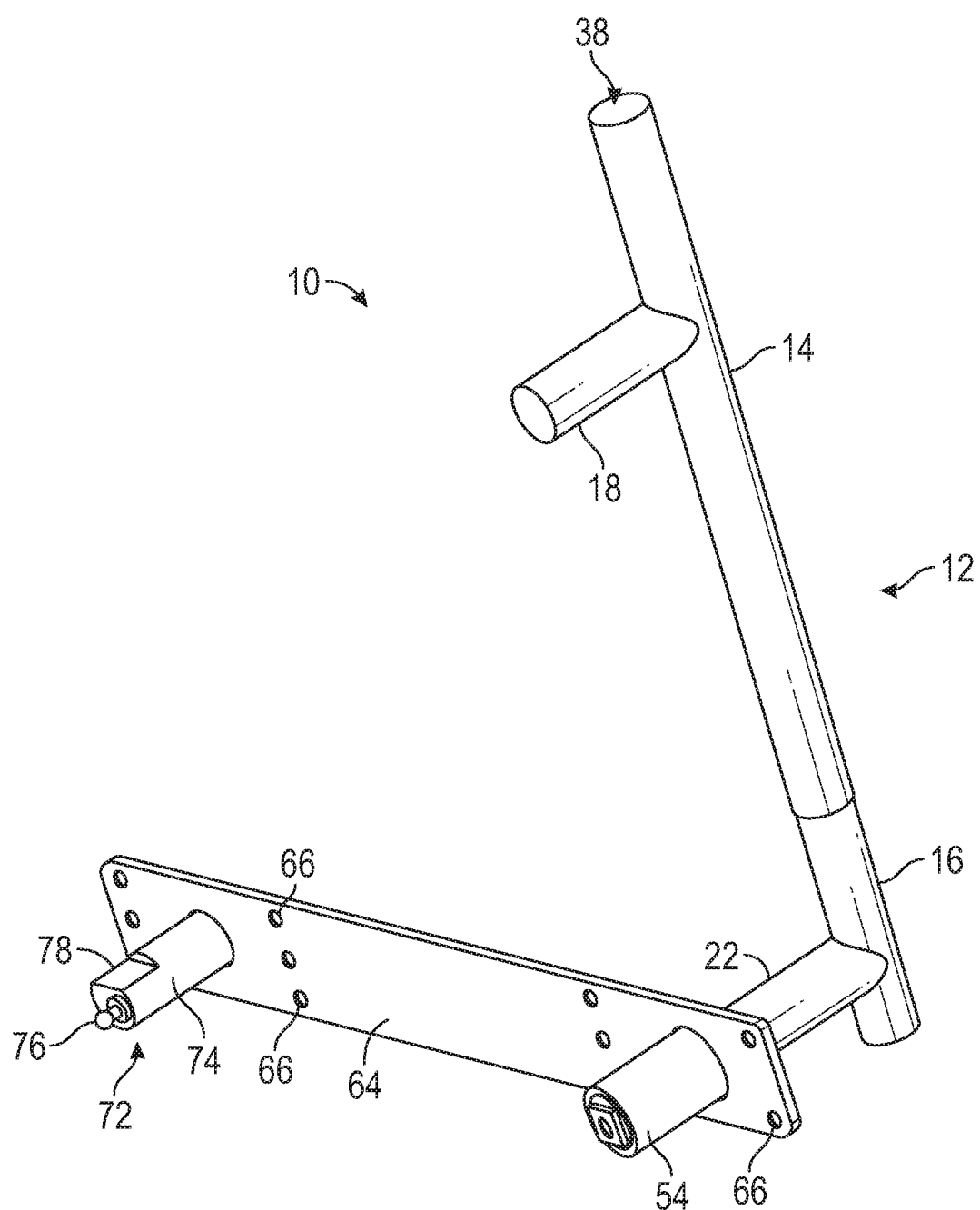
FIG. 3 is another perspective view of the cover lift system of FIG. 1.
Figure 4:
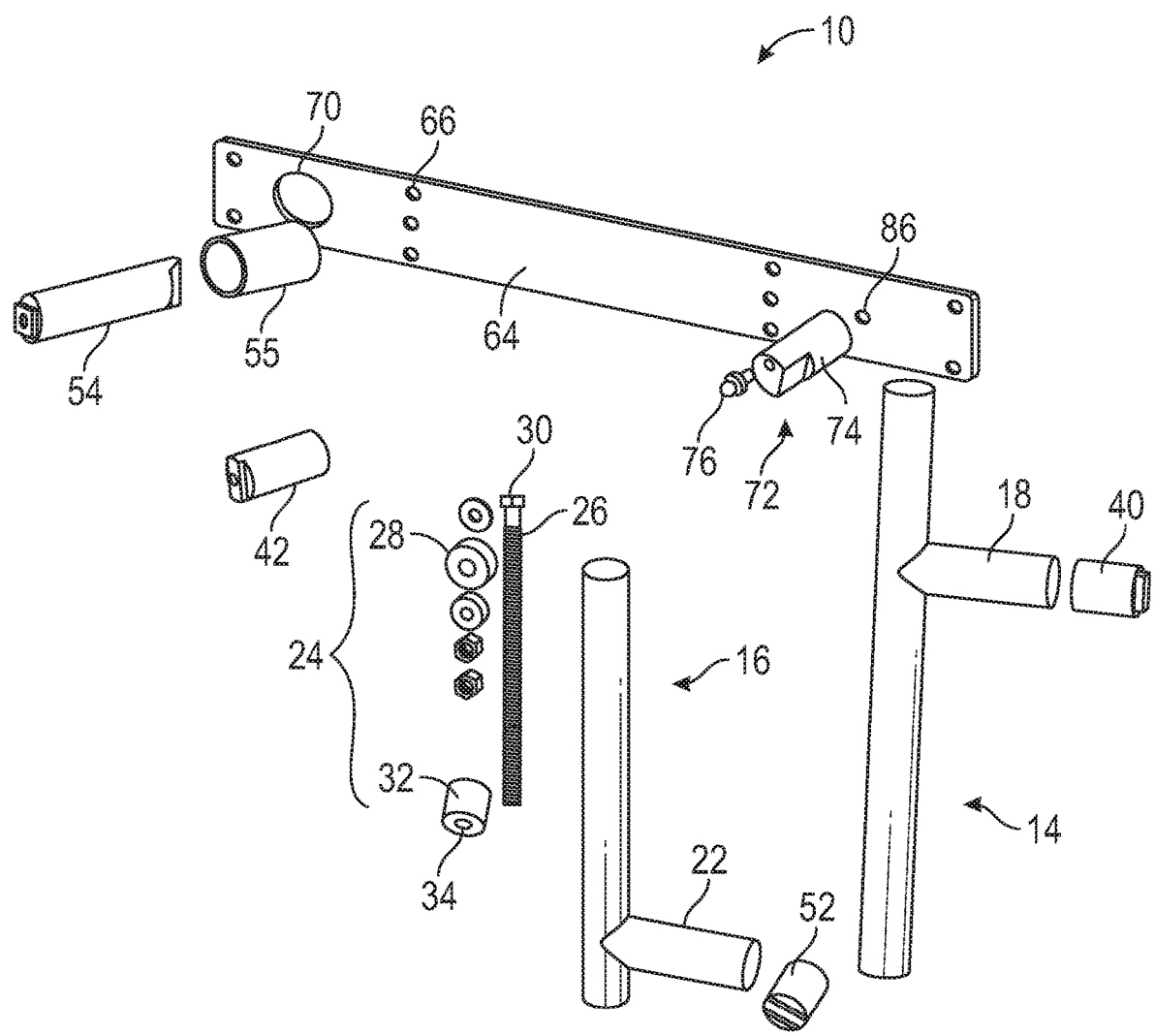
FIG. 4 is an exploded perspective view of the cover lift system of FIG. 1.
Figure 13:
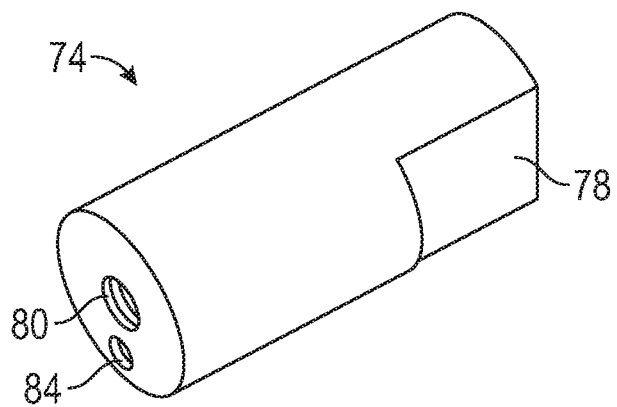
FIG. 13 is a perspective view of a ball stud holder of the cover lift system of FIG. 1.
Figure 14:
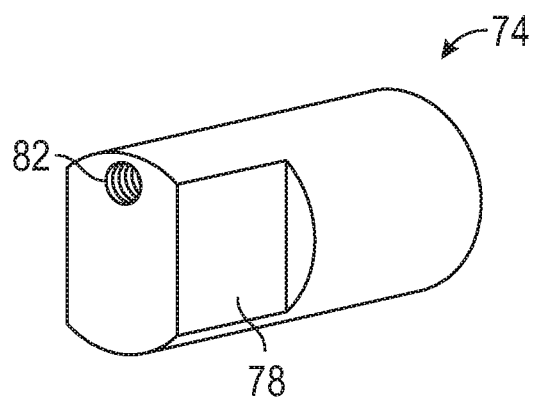
FIG. 14 is another perspective view of the ball stud holder of FIG. 13.
Figure 15:
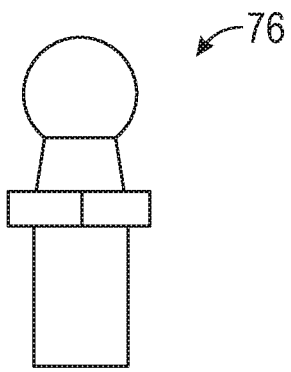
FIG. 15 is a plan view of a ball stud of the cover lift system of FIG. 1.

As shown in FIG. 2-4, the cover lift system 10 further includes a pivot mechanism 72 operatively connected to a lower end of the mounting bracket 64 on the inside surface thereof and which extends though the frame upright 68 to receive a lower end of the lift assist mechanism (e.g., a gas spring). FIGS. 13-15 more clearly show the configuration of the pivot mechanism 72. The pivot mechanism 72 includes a ball stud holder 74 and a ball stud 76. The ball stud holder 74 is generally cylindrical in shape and has a pair of opposed wrenching flats 78 on one end thereof. The ball stud holder 74 also includes a threaded center bolt hole 80 that is configured to receive a bolt for attaching the ball stud holder 74 to the mounting bracket 64 using a bolt, and a threaded aperture 82 on the end with the wrenching flats 78 for threadedly receiving a correspondingly threaded portion of the ball stud 76. As illustrated in FIG. 14, the threaded aperture 82 for mounting the ball stud 76 is offset from a central axis of the ball stud holder 74.

As indicated above, the pivot mechanism 72 holds the lower end of the lift assist mechanism (e.g., the gas spring). The offset of the ball stud 76 from the central axis of the ball stud holder 74 allows the ball stud 76 to be rotated out of position around the center bolt (not shown) that is received through the center bolt hole 80. The lift assist mechanism can then be attached by hand to the ball stud 76 with little effort. A wrench can then be used to engage the wrenching flats 78 to rotate the ball stud into position, exerting a compression load on the gas spring of the lift assist mechanism. This is accomplished by aligning a smaller threaded hole 84 on the other end of the ball stud holder 74 (that is likewise offset from the central axis) with a hole 86 in the bracket 64 and inserting a bolt to hold it in place. In this manner, the gas spring of the lift assist mechanism can be installed and compressed with very little effort in tightly enclosed space within the spa cabinet.

Figure 16:
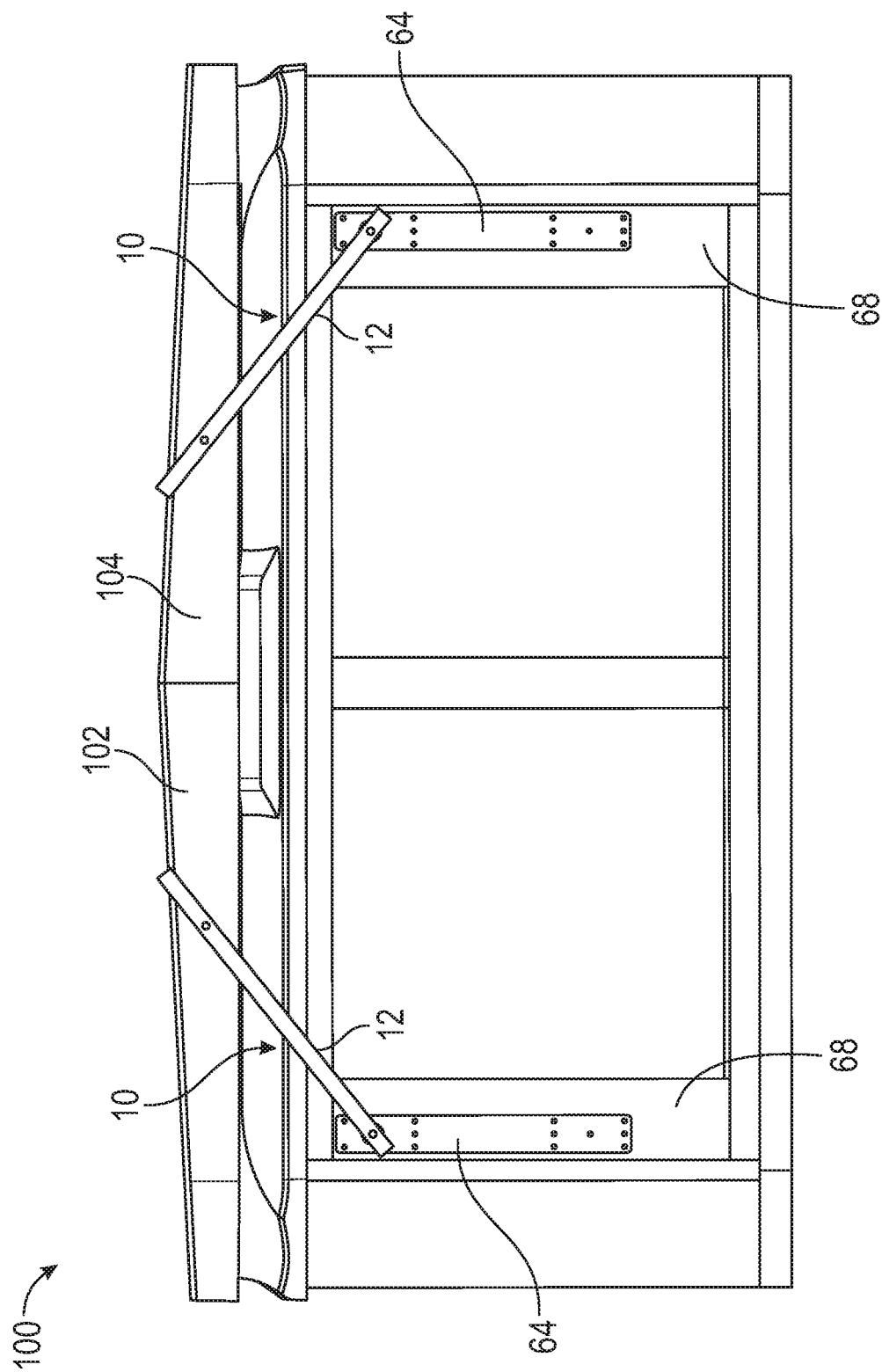
FIG. 16 is a side plan view of a spa having the cover lift system installed therein, with a side panel removed.
Figure 17:
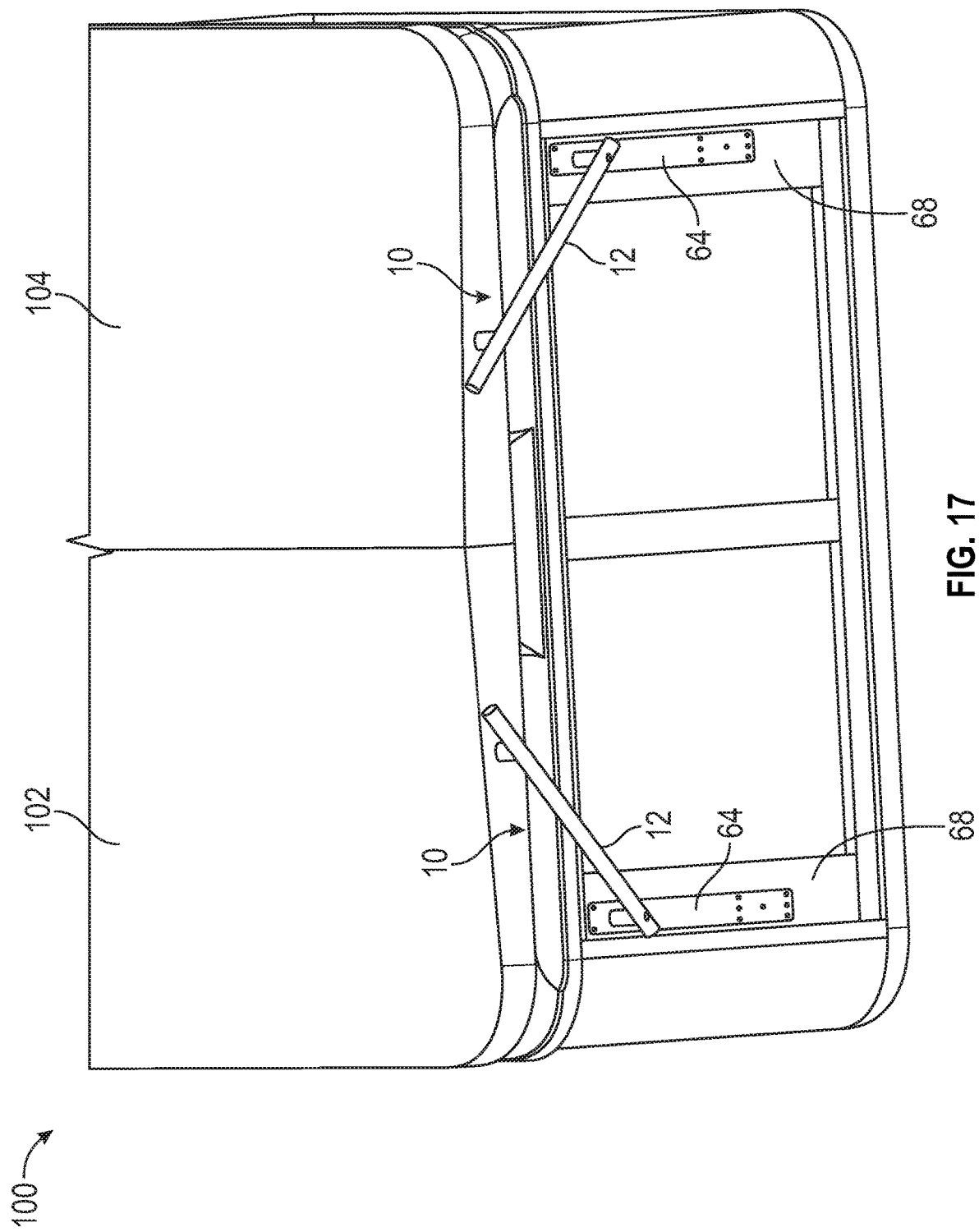
FIG. 17 is a perspective view of a spa having the cover lift system installed therein, with a side panel removed.

FIGS. 16 and 17 illustrate the cover lift system 10 of the present invention installed within a spa 100. In particular, spa 100 incudes a pair of cover lift systems 10 for covering and uncovering first and second cover members 102, 104, respectively. As indicated above, and as shown in FIGS. 16 and 17, each cover lift system 10 is attached to the outside surface of the frame uprights 68 of the frame of the spa 100. The crossbars extend through the cover member 102, 104 in order to transmit rotational movement of the lifter handle 12 to the cover members 102, 104, to remove the cover members 102, 104 from atop the spa during an uncovering operation, and to replace the cover members 102, 104 atop the spa during a covering operation.

In particular, in use, a gas spring mounted on the interior side of the bracket 64 provides a lift-assist force for both an uncovering and covering operation. In particular, when the cover is in a closed position, the lift-assist mechanism exerts a generally upward force on the cover member. To uncover the spa, a user grasps the lifter handle 12 and, in particular, the upper arm 14 thereof, and rotates the lifter handle 12 about a horizontal axis that extends through the connector member 22 of the lower arm 16. This rotational force is transmitted through the lifter handle 12 and the crossbar 20 that extends through the cover member, causing the cover member to slide from atop the spa to an uncovered position.

Importantly, the cover lift system 10 is configured such that the brackets 64 and other components thereof are hidden under the spa cabinet side panels (which are removed in FIGS. 16 and 17) during use. The cover lift system 10, however, can be easily installed and serviced in the field simply by removing the side panels.

Figure 18:
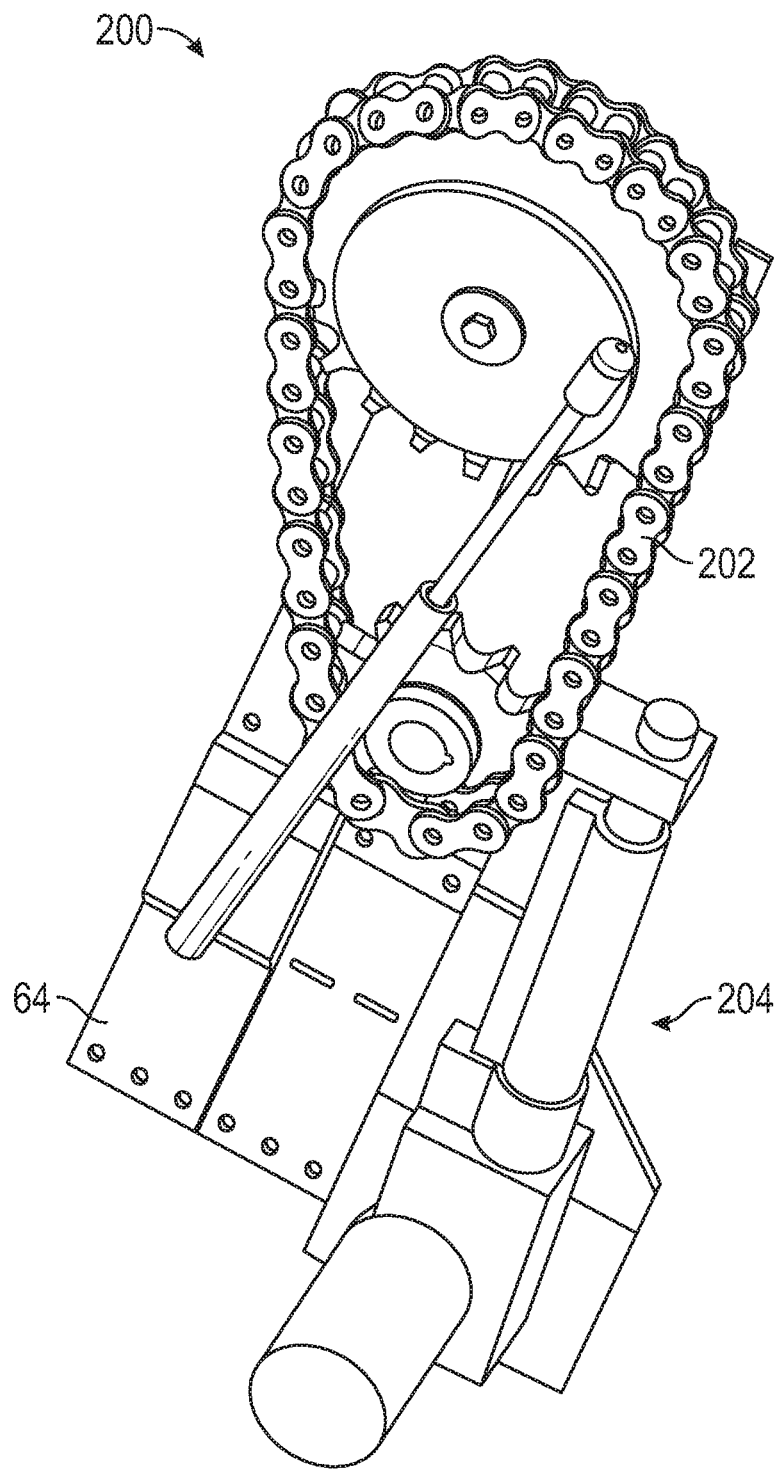
FIG. 18 is a perspective view of a linear actuator assembly for automatically opening and closing a spa cover.
Figure 19:
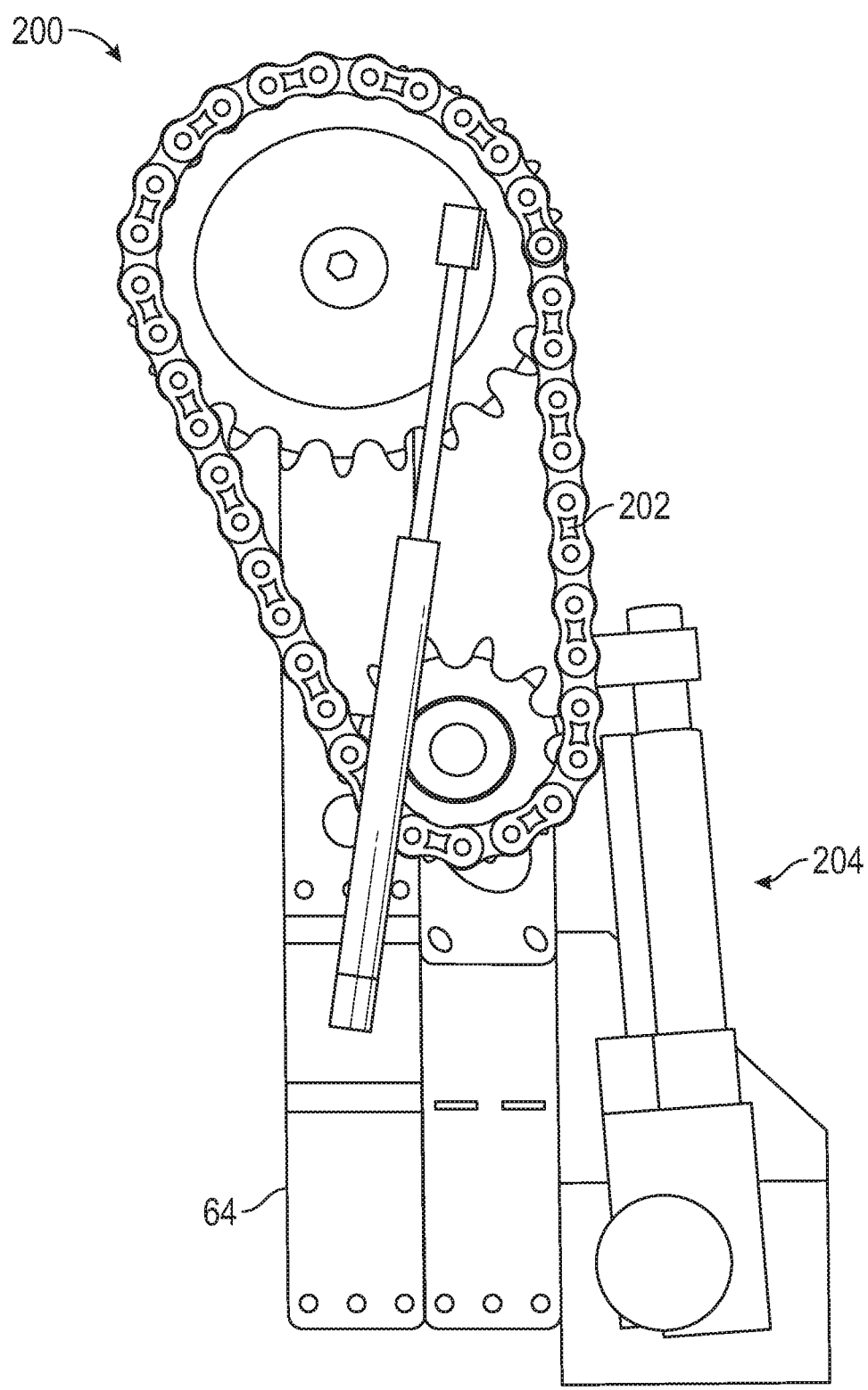
FIG. 19 is an elevational view of the linear actuator assembly of FIG. 18
Figure 20:
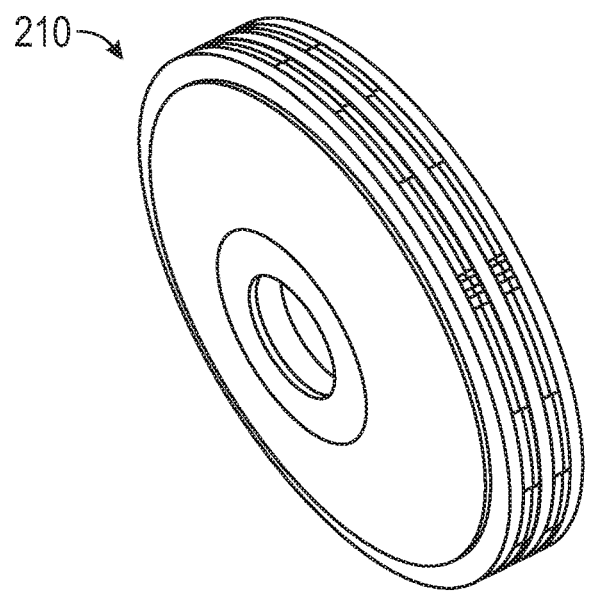
FIG. 20 is a perspective view of a friction plate torque limiter of the linear actuator assembly of FIG. 19.
Figure 21:
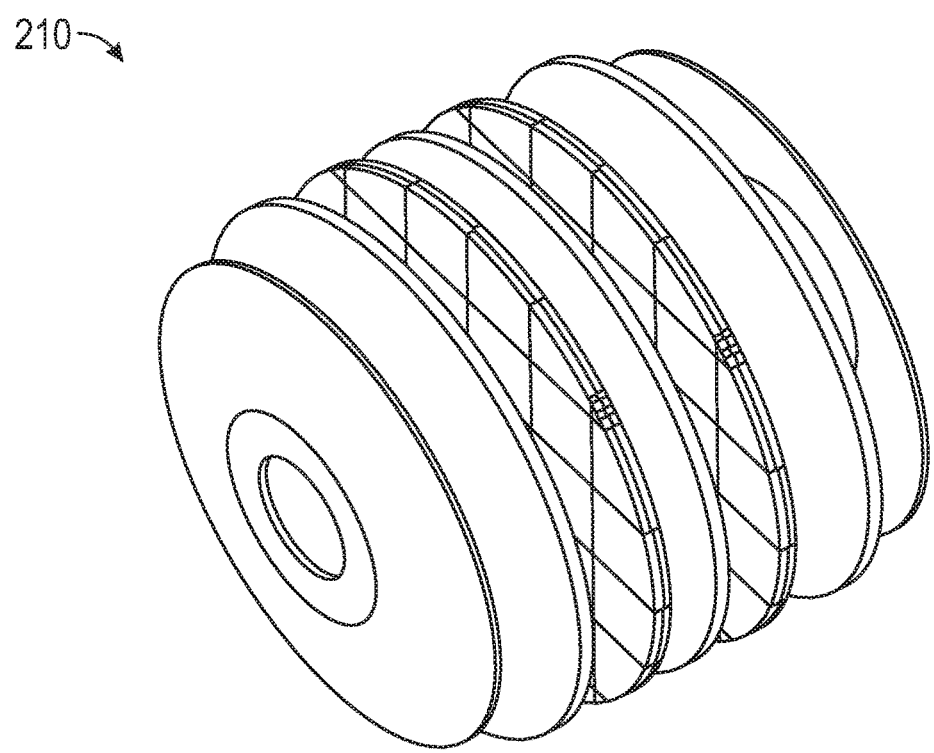
FIG. 21 is an exploded, perspective view of the torque limiter of FIG. 20.

Referring now to FIGS. 18 and 19, a linear actuator assembly 200 that can be used to automatically open and close the spa cover members 102, 104 is shown (instead of manual operation). The linear actuator assembly 200 mounts internally to the spa frame and connects to the cover lifter system 10 described above. The electrically driven linear actuator drives a chain 202 that rotates the lifter handle 12. This automated lift assembly can be chain driven from a linear actuator 204, as shown, or can be linkage driven with or without the chain with simple linkages such as a crank rocker configuration to rotate the lifter handle 12 and open the spa cover. With reference to FIGS. 20 and 21, the linear actuator assembly 200 may include a friction plate type torque limiter 210 used for breakaway safety.

Figure 22:
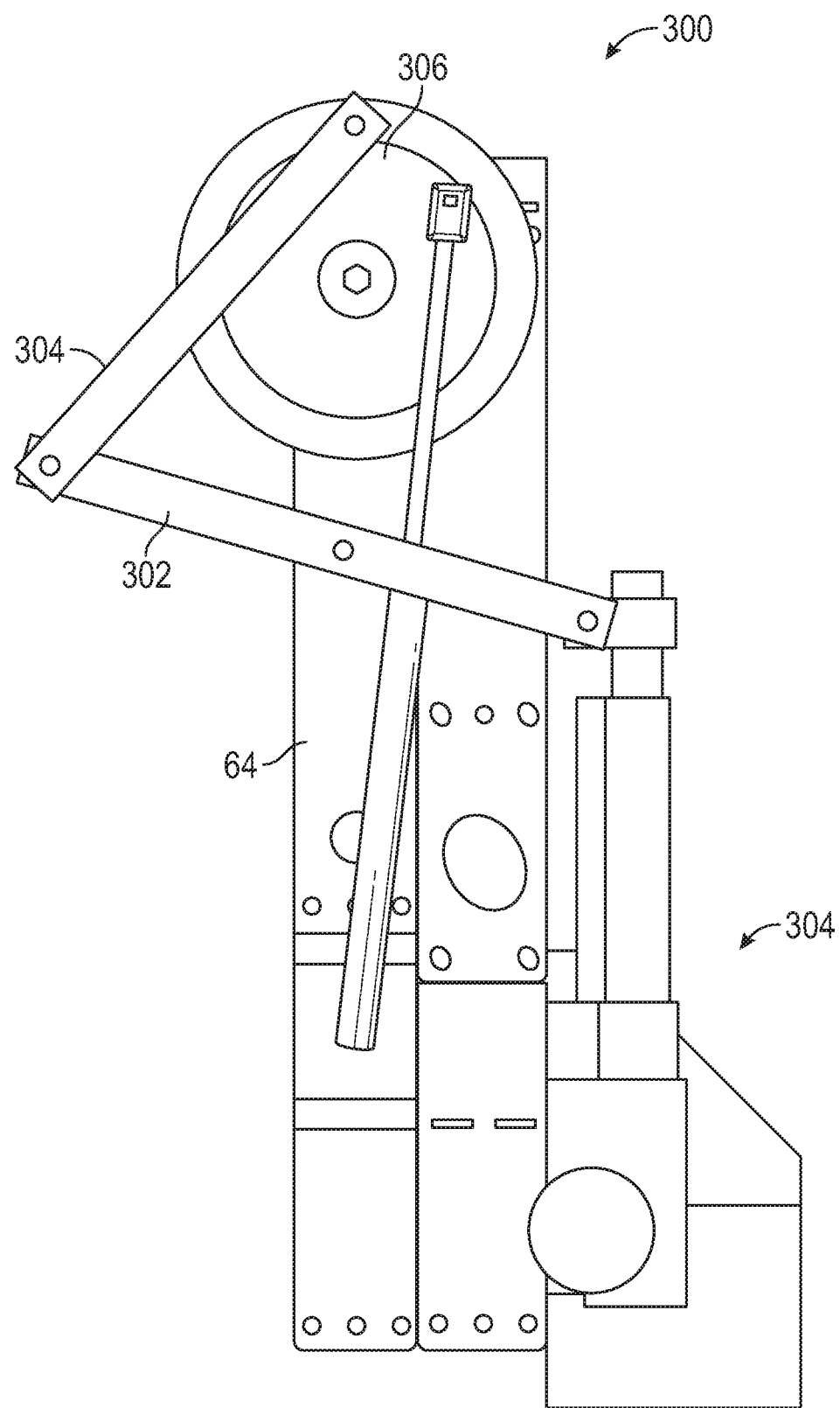
FIG. 22 is an elevational view of a linear actuator assembly according to another embodiment of the invention.
Figure 23:
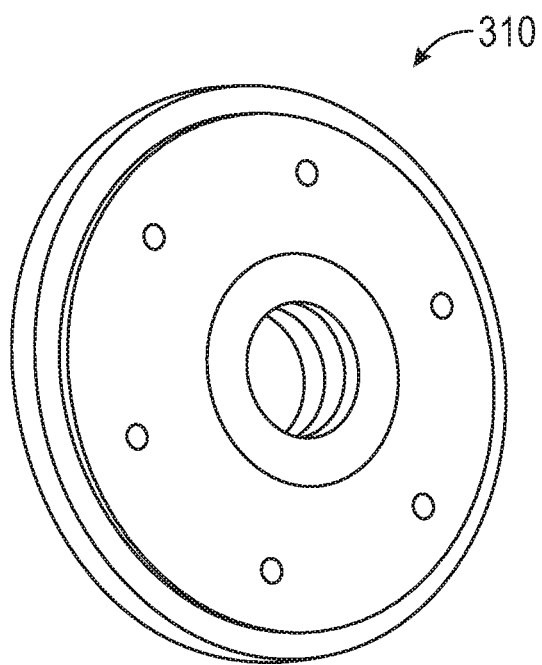
FIG. 23 is a perspective view of a ball/spring torque limiter of the linear actuator assembly of FIG. 22.
Figure 24:
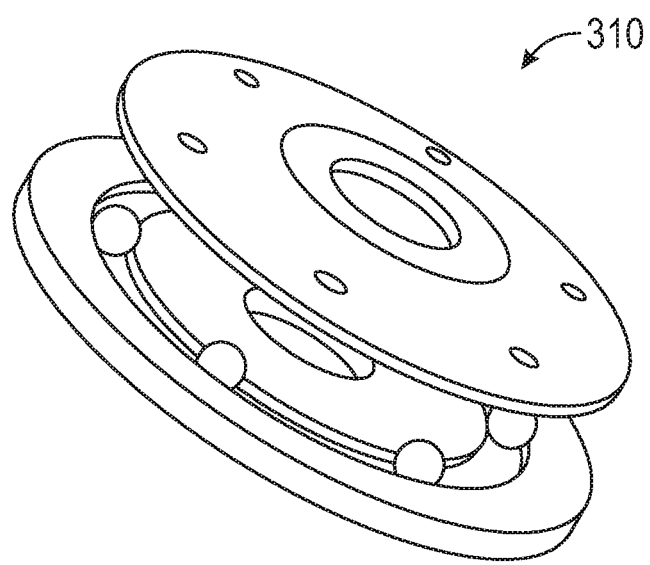
FIG. 24 is an exploded, perspective view of the torque limiter of FIG. 23.

With reference to FIGS. 22-24, in an embodiment, an automated lifter mechanism 300 may alternatively use mechanical linkages 302, 304 connecting the linear actuator 304 with the disk 306 for rotatably driving the disk (and thus lifter handle 12). As shown in FIGS. 23 and 24, this design may incorporate a ball/spring torque limiter 310 for use as a breakaway safety mechanism.

In either implementation, the torque limiting breakaway mechanism functions to release the drive mechanism from the cover when resistance to opening or closing is encountered by people or objects. In addition, the toque limiting breakaway mechanism is configured to decouples the drive mechanism from the cover when a person lifts up on the cover with nominative and sufficient force to break it free in an emergency or out of power situation where the spa cover needs to be opened. In an embodiment, the torque limiting breakaway mechanism will release the drive mechanism from the cover and will be fully restored to normal operating conditions when the cover is recycled through a normal opening and closing cycle.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cover lift system for a spa, comprising:
a lifter handle having an upper arm and a lower arm telescopically connected to the upper arm, the upper arm being configured for operative connection to a cover member of a spa, and the lower arm being configured for pivotal connection to a base of the spa; and
an adjuster mechanism associated with the lifter handle for selectively adjusting a length of the lifter handle in dependence upon a size of the spa;
wherein the adjuster mechanism is a linear actuator housed within at least one of the upper arm and/or the lower arm.

2. The cover lift system of claim 1, wherein:
the linear actuator includes a leadscrew in fixed longitudinal position within one of the upper arm or the lower arm, and a nut in fixed position within the other of the upper arm or the lower arm; and
wherein the leadscrew is threadedly received by the nut.

3. The cover lift system of claim 2, wherein:
the leadscrew includes a drive head accessible through an upper end of the upper arm; and
wherein the leadscrew is rotatable via the drive head to adjust the distance between the first point and the second point.

4. The cover lift system of claim 1, further comprising:
a coupling member associated with the lower arm configured to matingly engage a shaft of a lift-assist mechanism;
wherein the coupling member and the shaft have geometries that allow for a degree of rotational misalignment between the coupling member and the shaft when mating the coupling member to the shaft.

5. The cover lift system of claim 1, further comprising:
a breakaway mechanism configured to decouple a drive mechanism of the cover lift system from the cover member when resistance to opening or closing the cover member is encountered, to limit an amount of torque seen by the lifter handle during a covering or uncovering operation of the spa.

6. The cover lift system of claim 1, further comprising:
a first coupling member associated with the upper arm, the first coupling member being configured to matingly engage a second coupling member associated with a crossbar that extends through the cover of the spa.

7. The cover lift system of claim 6, further comprising:
a third coupling member associated with the lower arm, the third coupling member being configured to matingly engage a shaft insert of a lift-assist mechanism.

8. The cover lift system of claim 7, wherein:
the third coupling member and the shaft insert have geometries that allow for a degree of rotational misalignment between the third coupling member and the shaft insert when mating the third coupling member to the shaft insert.

9. The cover lift system of claim 8, wherein:
one of the third coupling member and the shaft insert has a stepped end that is receivable in a corresponding stepped slot in the other of the third coupling member and the shaft insert.

10. The cover lift system of claim 9, wherein:
the degree of rotational misalignment is about 20 degrees.

11. The cover lift system of claim 1, further comprising:
a mounting bracket operatively connected to the lower arm, the mounting bracket being configured to attach the cover lift system to an external side of the base of the spa.

12. A cover lift system for a spa, comprising:
a lifter handle having a first end configured for connection to a cover of a spa, and a second end configured for connection to a base of the spa; and
a breakaway mechanism configured to decouple a drive mechanism of the cover lift system from the cover when resistance to opening or closing the cover is encountered, to limit an amount of torque seen by the lifter handle during a covering or uncovering operation of the spa.

13. The cover lift system of claim 12, wherein:
the lifter handle includes an upper arm and a lower arm telescopically connected to the upper arm, the upper arm being configured for operative connection to the cover of the spa, and the lower arm being configured for pivotal connection to the base of the spa; and
an adjuster mechanism associated with the lifter handle for selectively adjusting a length of the lifter handle to allow for use of the lifter handle with spas of varying sizes.

14. The cover lift system of claim 13, wherein:
the adjuster mechanism is a linear actuator housed within at least one of the upper arm and/or the lower arm.

15. The cover lift system of claim 14, wherein:
the linear actuator includes a leadscrew in fixed longitudinal position within one of the upper arm or the lower arm, and a nut in fixed position within the other of the upper arm or the lower arm; and
wherein the leadscrew is threadedly received by the nut.

16. The cover lift system of claim 15, wherein:
the leadscrew includes a drive head accessible through an upper end of the upper arm; and
wherein the leadscrew is rotatable via the drive head to adjust the distance between the first point and the second point.

17. The cover lift system of claim 13, further comprising:
a coupling member associated with the lower arm configured to matingly engage a shaft of a lift-assist mechanism;
wherein the coupling member and the shaft have geometries that allow for a degree of rotational misalignment between the coupling member and the shaft when mating the coupling member to the shaft.

18. The cover lift system of claim 12, wherein:
the breakaway mechanism includes one of a ball-detent torque limiter and/or a friction plate torque limiter.

19. A method of installing a cover lift system on a spa, comprising:
connecting a first end of a lifter handle to a cover of a spa;
connecting a second end of the lifter handle to a base of the spa; and
outfitting the lifter handle with a breakaway mechanism configured to decouple a drive mechanism of the cover lift system from the cover member when resistance to opening or closing the cover member is encountered, to limit an amount of torque seen by the lifter handle during a covering or uncovering operation of the spa.

* * * * *